R. DEXTER & P. POND.
Fertilizing Machines.

No. 155,013. Patented Sept. 15, 1874.

Witnesses:
John R. Heard
Francis Allen

Inventors.
Richard Dexter and
Philander Pond.
by Alban Andrew, atty.

UNITED STATES PATENT OFFICE.

RICHARD DEXTER AND PHILANDER POND, OF WORCESTER, MASSACHUSETTS, ASSIGNORS OF ONE-THIRD THEIR RIGHT TO OTIS N. POND, OF SAME PLACE.

IMPROVEMENT IN FERTILIZING-MACHINES.

Specification forming part of Letters Patent No. 155,013, dated September 15, 1874; application filed July 3, 1874.

*To all whom it may concern:*

Be it known that we, RICHARD DEXTER and PHILANDER POND, both of Worcester, in the county of Worcester and State of Massachusetts, have jointly invented certain new and useful Improvements in Fertilizing-Machines; and we do hereby declare that the following is a full, clear, and exact description thereof, which will enable others skilled in the art to which it pertains to make and use the same, reference being had to the accompanying drawings, and to the letters of reference marked thereon, which form a part of this specification.

Our invention relates to improvements in fertilizing-machines for the purpose of mixing and spreading liquid manure; and consists in the employment of a tank, on wheels, in combination with a pair of revolving spiral-shaped beaters, stationary bars, between which the beaters revolve, and a revolving spreader, as will now be herein more fully shown and described.

Figure 2:
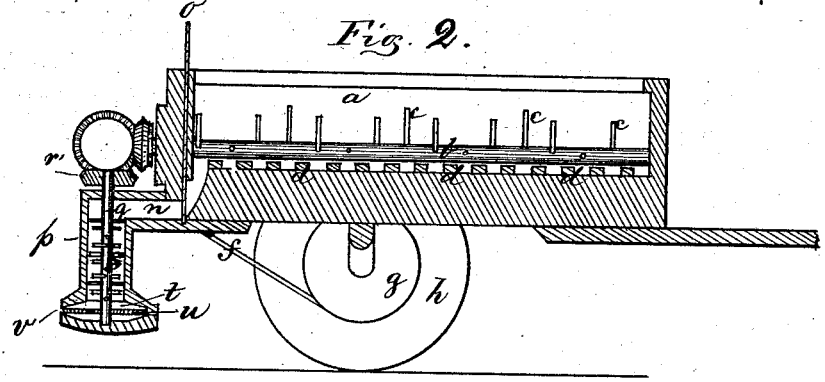
Figure 1:
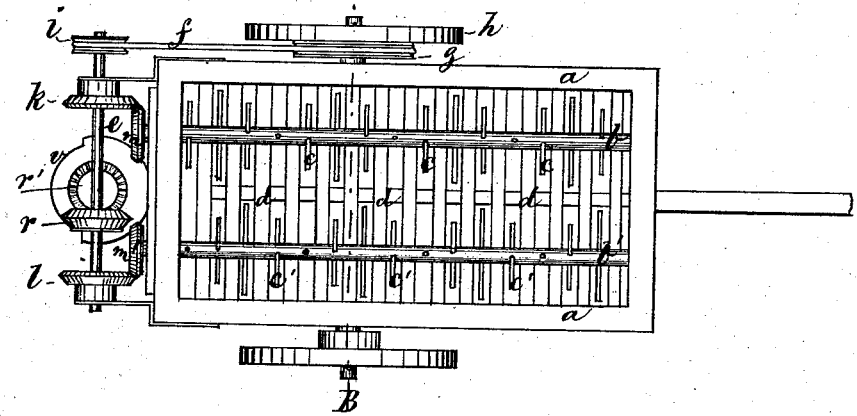
Figure 3:
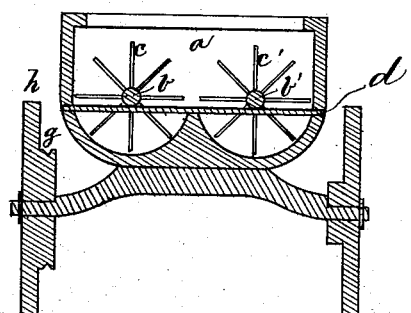

On the drawings, Figure 1 represents a ground plan of our invention. Fig. 2 represents a central longitudinal section, and Fig. 3 represents a cross-section on the line A B, shown in Fig. 1.

Similar letters refer to similar parts wherever they occur on the drawings.

$a$ represents the tank or receptacle for the manure and water, which tank is provided with a pair of revolving shafts, $b$ $b'$, running in bearings in the ends of the tank. To the revolving shafts $b$ $b'$ are secured beaters or mixers $c$ $c$ $c$ $c'$ $c'$ $c'$, arranged spirally on the the said shafts, as shown.

As the beaters or mixers $c$ $c'$ revolve they are made to pass between stationary bars $d$ $d$, arranged in the tank $a$, for the purpose of more thoroughly mixing and beating the semi-liquid manure, as the rotary beaters $c$ $c'$ revolve between the said stationary bars $d$ $d$. An intermediate shaft, $e$, resting in bearings attached to the rear end of the tank $a$, is set in a rotary motion by means of a belt or chain, $f$, running over a drum, $g$, attached to one of the wheels $h$ and a small pulley, $i$, secured to the intermediate shaft $e$, as shown in Fig. 1. The shafts $b$ $b'$ are set in motion from the intermediate shaft $e$ by means of bevel-gears $k$ $l$, attached to the shaft $e$, and bevel-gears $m$ $m'$, secured, respectively, to the shafts $b$ and $b'$, as shown.

In the rear end of the tank $a$ is made an opening, $n$, through which the liquid manure is allowed to flow out from the tank or receptacle $a$. An adjustable slide, $o$, is arranged to close the opening $n$, if it is desired to transport the machine over the ground without distributing the manure, and to regulate the flow of the liquid manure when the machine is distributing it. The opening or conductor $n$ conducts the liquid manure from the tank or receptacle $a$ to the spreader or deliverer, that consists of a cylinder, $p$, in which the shaft $q$ is kept in a rotary motion by means of bevel-gears $r$ $r'$, as shown in Fig. 1. To the shaft $q$ is attached a number of spirally-arranged arms, $s$ $s$, for the purpose of beating and mixing the liquid manure additional as it flows from the tank $a$. The lower end of the cylinder $p$ is enlarged as a circular chamber, $t$, in which is located the spreader $u$, that is attached to, and made to revolve with, the shaft $q$. A slotted opening, $v$, is made on the rear side of the chamber $t$, through which the liquid manure is forced out over the ground, partly by the pressure of the liquid in the tank $a$, and partly by the centrifugal motion of the spreader $u$. The spreader $u$ also acts as a cleaner in the slotted opening $v$, and in this manner keeps the said outlet always unobstructed from fibrous or gritty particles that may be delivered from the tank $a$.

The machine may be propelled over the ground by animal or steam power, as may be desired, according to the size of the same.

Having thus fully described the nature, construction, and operation of our invention, we wish to secure by Letters Patent, and claim—

1. The rotary spreader for fertilizing-machines, as herein shown, consisting of the vertical cylinder $p$, revolving shaft $q$, beaters $s$, slotted chamber $u$ $v$, and the rotary cleaners $t$, combined as and for the purpose set forth.

2. The combination of the tank $a$, rotary shafts $b$ $b'$, with their spirally-arranged beaters $c$ $c'$, the stationary bars $d$ $d$ $d$, slide $o$, and the spreader $p$ $q$ $s$ $t$ $u$ $v$, as and for the purpose set forth.

In testimony that we claim the foregoing as our own invention we have affixed our signatures in presence of two witnesses.

RICHARD DEXTER.
PHILANDER POND.

Witnesses:
    FRANCIS PLUNKETT,
    F. T. BLACKMER.